(12) United States Patent
Bohge et al.

(10) Patent No.: US 11,191,002 B2
(45) Date of Patent: Nov. 30, 2021

(54) COMMUNICATION NODE FOR A SEQUENCE-BASED COMMUNICATION NETWORK

(71) Applicant: R3—Reliable Realtime Radio Communications GmbH, Berlin (DE)

(72) Inventors: Mathias Bohge, Berlin (DE); Florian Bonanati, Berlin (DE); James Gross, Stockholm (SE)

(73) Assignee: R3—RELIABLE REALTIME RADIO COMMUNICATIONS GMBH, Berlin (DE)

(*) Notice: Subject to any disclaimer, the term of this patent is extended or adjusted under 35 U.S.C. 154(b) by 0 days.

(21) Appl. No.: 16/642,230

(22) PCT Filed: Aug. 30, 2018

(86) PCT No.: PCT/EP2018/073386
§ 371 (c)(1),
(2) Date: Feb. 26, 2020

(87) PCT Pub. No.: WO2019/048339
PCT Pub. Date: Mar. 14, 2019

(65) Prior Publication Data
US 2020/0359294 A1 Nov. 12, 2020

(30) Foreign Application Priority Data
Sep. 11, 2017 (EP) .................................. 17190332

(51) Int. Cl.
*H04L 12/417* (2006.01)
*H04W 40/12* (2009.01)
(Continued)

(52) U.S. Cl.
CPC .......... *H04W 40/12* (2013.01); *H04L 1/0026* (2013.01); *H04L 12/417* (2013.01); *H04L 12/42* (2013.01);
(Continued)

(58) Field of Classification Search
None
See application file for complete search history.

(56) References Cited

U.S. PATENT DOCUMENTS

2002/0178250 A1* 11/2002 Haartsen ............... H04L 12/417
709/223
2006/0039371 A1* 2/2006 Castro .................... H04L 45/02
370/389
(Continued)

FOREIGN PATENT DOCUMENTS

WO 2017/050705 A1 3/2017
WO 2017/089388 A1 6/2017

OTHER PUBLICATIONS

International Search Report and Written Opinion dated Oct. 15, 2018 issued in related International Patent Application No. PCT/EP2018/073386; filed Aug. 30, 2018.
(Continued)

*Primary Examiner* — Ajit Patel
(74) *Attorney, Agent, or Firm* — Gordon Rees Scully Mansukhani, LLP

(57) ABSTRACT

An embodiment of the invention relates to a communication node (CN, N1-N4) capable of communicating with other nodes in a communication system (10) according to a given communication sequence (S). The communication node comprises an analysis unit (110) configured to determine the optimal position of its communication node inside the communication sequence (S) as well as the corresponding optimal predecessor node.

22 Claims, 5 Drawing Sheets

(51) Int. Cl.
*H04L 1/00* (2006.01)
*H04L 12/42* (2006.01)
*H04L 12/24* (2006.01)
*H04L 12/751* (2013.01)
*H04W 8/00* (2009.01)
*H04W 24/10* (2009.01)
*H04W 84/18* (2009.01)

(52) U.S. Cl.
CPC .............. *H04L 41/12* (2013.01); *H04L 45/02* (2013.01); *H04W 8/005* (2013.01); *H04W 24/10* (2013.01); *H04W 84/18* (2013.01)

(56) References Cited

U.S. PATENT DOCUMENTS

| | | | |
|---|---|---|---|
| 2006/0088039 A1* | 4/2006 | Kakivaya | H04L 67/1048 370/400 |
| 2007/0104215 A1 | 5/2007 | Wang et al. | |
| 2011/0082928 A1 | 4/2011 | Hasha et al. | |
| 2011/0267981 A1 | 11/2011 | Davies | |

OTHER PUBLICATIONS

European Search Report dated Nov. 23, 2017 issued in related EP Application No. 17190332.1-1853; filed Sep. 11, 2017.

* cited by examiner

COMMUNICATION NODE FOR A
SEQUENCE-BASED COMMUNICATION
NETWORK

The invention relates to a communication node that is capable of communicating with other nodes in a communication system according to a given communication sequence.

BACKGROUND OF THE INVENTION

Patent Applications WO 2017/050705 A1 and WO 2017/089388 A1 disclose a sequence-based communication system where communication nodes send signals to allocated downstream communication nodes and receive signals from allocated upstream communication nodes. More specifically, the communication system is a token-passing based wireless ring system where a token is passed from node to node. After leaving a given node, the token reaches this given node again after completing the entire token-passing sequence and having been forwarded by each of the other nodes of the token-passing sequence. The token passing sequence is therefore a communication sequence that is circular and forms a closed-loop sequence. The token passing sequence according to the Patent Applications WO 2017/050705 A1 and WO 2017/089388 A1 can also be called simple ring-shaped.

Patent Applications US 2007/104215 A1 and US 2011/267981 A1 disclose mesh-type communication systems, i.e. communication systems without ring structure and without ring-shaped token passing sequence.

Patent Application US 2011/082928 A1 discloses a method for a joining node to join a ring of nodes within a rendezvous federation where the joining node indicates its intent to take id-space ownership for a portion of the id-space between the joining node and a selected immediately adjacent node.

OBJECTIVE OF THE PRESENT INVENTION

An objective of the present invention is to provide a communication node with improved capabilities regarding the communication in a sequence-based communication network.

A further objective of the present invention is to provide an improved method of operating a communication node, in particular with regard to the resulting communication sequence in a sequence-based communication network.

BRIEF SUMMARY OF THE INVENTION

An embodiment of the invention relates to a communication node that is capable of communicating with other nodes in a communication system according to a given communication sequence. The communication node comprises an analysis unit configured to determine the optimal position of its communication node inside the communication sequence as well as the corresponding optimal predecessor node.

An advantage of this embodiment of the invention is that the communication node is capable of carrying out and/or supporting a topology management in a sequence-based network such as for instance an EchoRing (i.e. a token-passing based wireless network where a token is passed from one node to the subsequent node according to a token passing sequence). An optimized topology and an optimized token-passing is vital to the time management in a wireless system in particular for latency-critical applications. As token-passing assumes a fixed sequence in which the token is passed through the network, and the links between nodes have typically different qualities, there is always some token-passing sequence better than the rest of the sequences. The term "better" refers to the reliability that can be achieved while passing on the token. The communication node described above allows a token-passing system like EchoRing to achieve its optimal token-passing sequence during run-time even if the link qualities in the network might change over time.

The communication system is preferably a token-passing based wireless network where a token is passed from one node to the subsequent node according to said communication sequence which thereby forms a token passing sequence.

The token passing sequence may be simple ring-shaped. The term "simple ring-shaped" hereinafter means that after leaving a given node, the token reaches this given node again after completing the entire token passing sequence and having been forwarded by each of the other nodes of the token passing sequence.

Alternatively, the token passing sequence may be extended ring-shaped. The term "extended ring-shaped" hereinafter means that one or more nodes receive and forward the token more than once during each token passing sequence. Preferably, more important nodes (e.g. nodes that need to transmit more data compared to other nodes) receive and forward the token more often than less important nodes (e.g. nodes that need to transmit less data compared to the important nodes) during each token passing sequence.

The token is preferably formed by a single and/or unique token packet.

The analysis unit is preferably configured to determine the optimal position of its communication node inside the communication sequence after joining the communication system.

Alternatively or additionally, the analysis unit may be configured to determine the optimal position of its communication node inside the communication sequence before joining the communication system.

The analysis unit is preferably configured to determine the optimal position based on quality data that describes the quality of communication links.

The quality data preferably consists of or includes data that describes the quality of communication links between the communication node and at least two other nodes of the communication system.

Further, the quality data may include data that is exchanged between the nodes of the communication system and describe the quality of the communication links between each node of the communication system and its corresponding predecessor node.

A control unit of the communication node is preferably configured to manage the entry into the communication system. The control unit preferably evaluates join messages that are received from nodes of the communication system, accepts the join message from the optimal predecessor node that has been identified by the analysis unit, and ignores join messages from other nodes of the communication system.

Alternatively or additionally, the control unit may be configured to initiate and/or manage the swap of places with another node of the communication system in order to reach its optimal position or at least improve its position. The swap of places is preferably initiated and carried out during the token holding time of the control unit's communication node. Preferably the swap is initiated and carried out if the communication node does not hold payload information to be transmitted.

Further, the communication node, for instance its control unit, is preferably configured to transmit—after disruption of the communication system—a request to join a restored communication system as well as stored quality data that describe the quality of communication links between nodes of the disrupted communication system.

Moreover, the communication node, for instance its control unit, is preferably capable of acting as a dedicated node that—after disruption of the communication system—receives quality data from former nodes of the communication system, determines an optimal new communication sequence, announces the new communication sequence, and solicits the entry of nodes into the communication system in accordance with the new communication sequence.

The communication node preferably comprises a processor, a memory and a transceiver module. The transceiver module transmits and receives data signals.

The analysis unit and the control unit are preferably software modules which are stored in the memory of the communication node. The processor is preferably connected with the memory and runs the software modules.

The software module that forms the analysis unit is preferably programmed to determine the optimal position of its communication node inside a communication sequence before and/or after joining a communication system.

The software module that forms the control unit is preferably programmed
  to manage the entry into a communication system and/or
  to initiate and manage the swap of places inside a communication sequence and/or
  to re-establish a disrupted communication network.

The communication system is preferably a token-passing based wireless ring system where a token is passed from node to node according to said given communication sequence which thereby forms a simple or extended ring-shaped token passing sequence.

The communication node is preferably configured to measure the channel quality regarding signals that are received from each of the other communication nodes of the communication system.

The communication node is preferably further configured to forward respective measured quality values to its allocated downstream communication node (the allocation with respect to the simple or extended ring-shaped token passing sequence) such that—after one ring cycle—each of the communication nodes has knowledge about the quality of each possible communication link in the communication system.

The communication node is preferably configured to transmit the measured quality values as part of the token or within the token.

The communication node is preferably configured to generate a channel quality matrix based on the measured quality values.

The communication node is preferably configured to transmit the channel quality matrix to its allocated (with respect to the ring-shaped token passing sequence) downstream communication node as part of the token or within the token.

A further embodiment of the invention relates to a method of operating a communication node that is capable of communicating with other nodes in a communication system according to a given communication sequence, wherein the optimal position of the communication node inside the communication sequence as well as the corresponding optimal predecessor node is determined.

Before joining the communication system the corresponding optimal predecessor node may be determined. Join messages from other nodes than the optimal predecessor node are preferably ignored, and a join message from the optimal predecessor node is preferably awaited and accepted upon receipt.

The optimal position of the communication node inside the communication sequence may—in addition or alternatively—be determined after joining the communication system. A swap of places may be initiated in order for the communication node to reach its optimal position or at least improve its position.

Further, the communication node may be operated as a dedicated node that—after disruption of the communication system—receives quality data from former nodes of the communication system, determines an optimal new communication sequence, announces the new communication sequence, and solicits the entry of nodes into the communication system in accordance with the new communication sequence.

A further embodiment of the invention relates to a communication system comprising nodes capable of communicating with other nodes in a communication system according to a given communication sequence, wherein each of the communication nodes comprises an analysis unit configured to determine the optimal position of its communication node inside the communication sequence as well as the corresponding optimal predecessor node.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
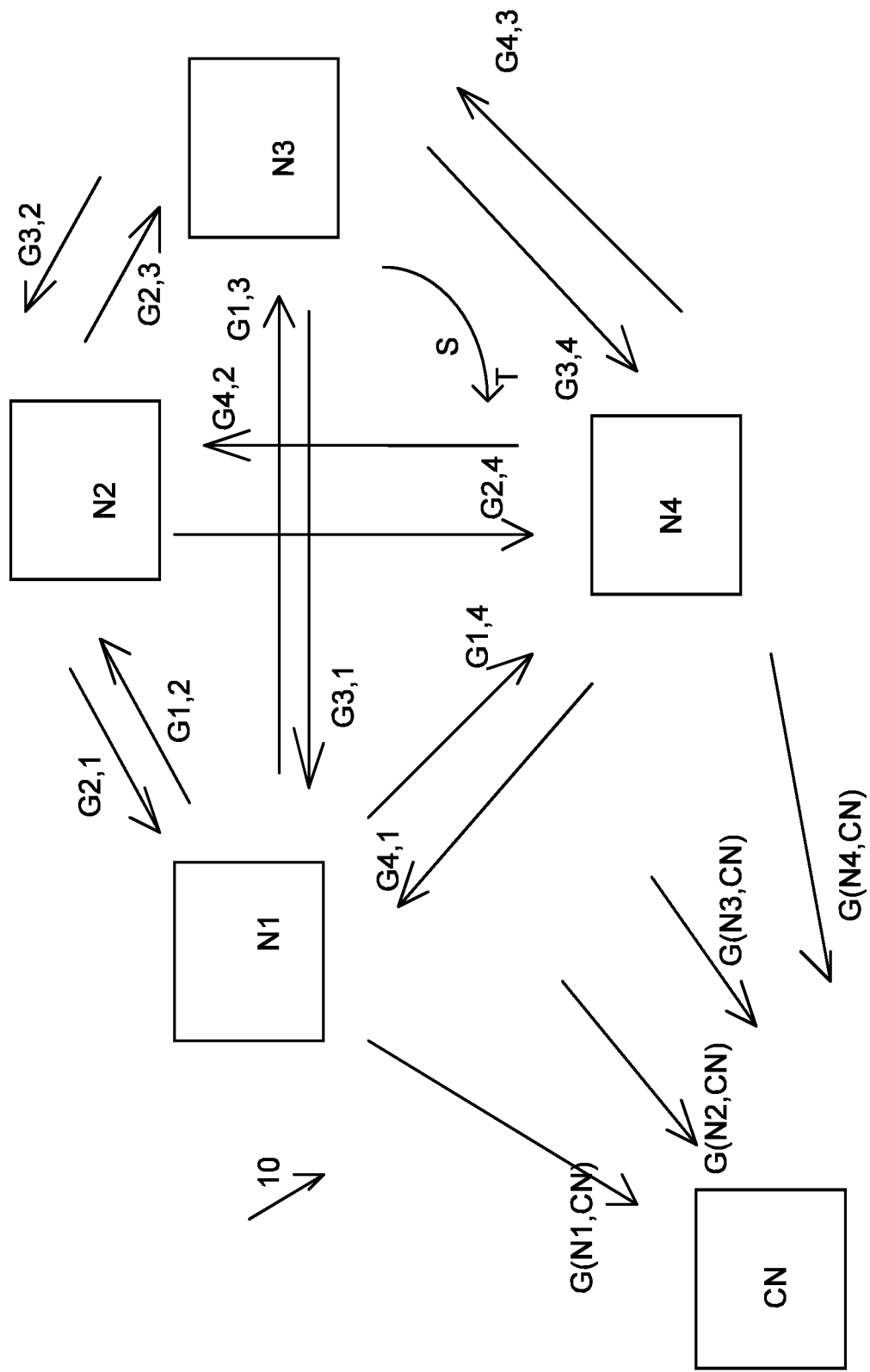
FIG. 1 illustrates an exemplary embodiment of a sequence-based communication network shortly before a new communication node joins the network.

FIG. 1 shows an exemplary embodiment of a communication system 10. Communication nodes N1, N2, N3 and N4 of the communication system 10 communicate with one another according to a given communication sequence S. The communication system 10 may be a token-passing based wireless network where a token T is passed from one node to a subsequent node according to the communication sequence S. For instance, the communication system 10 may be a wireless token ring system based on a token passing sequence S.

Supposing that a roaming communication node CN intends to join the communication system 10, the communication node CN may operate as follows:

First, the communication node CN evaluates signals that are received from the other nodes N1-N4. Based on the received signals, the communication node CN determines quality data that describe the channel or link quality of the respective communication links. The quality data may consist of or include quality values G(N1,CN), G(N2,CN), G(N3,CN) and G(N4,CN).

The quality values G(N1,CN), G(N2,CN), G(N3,CN) and G(N4,CN) may be calculated based on transmission rates, bit error rates and/or durations of interruptions. For instance, the values may be calculated as follows:

$$G(Ni, CN) = \text{sum}(s1, \ldots si, \ldots st)/t$$

where si with $1 <= i <= t$ refers to the received signal strength of the preamble of the reference signal received at time instance i.

Based on the quality values G(N1,CN), G(N2,CN), G(N3, CN) and

G(N4,CN), the communication node CN may determine its optimal position inside the communication sequence S. For instance, the communication node CN determines the highest quality value and the corresponding node N1, N2, N3 or N4. The communication node with the highest quality value may then be chosen as the corresponding optimal predecessor node. If, for instance, G(N1,CN)>G(N2,CN), G(N3,CN) and G(N4,CN)

the communication node CN may choose the communication node N1 as its optimal predecessor node.

Thereafter, the communication node CN awaits a join message from this optimal predecessor node N1 and accepts this join message upon receipt. Join messages from the other nodes N2-N4 are ignored.

Figure 2:
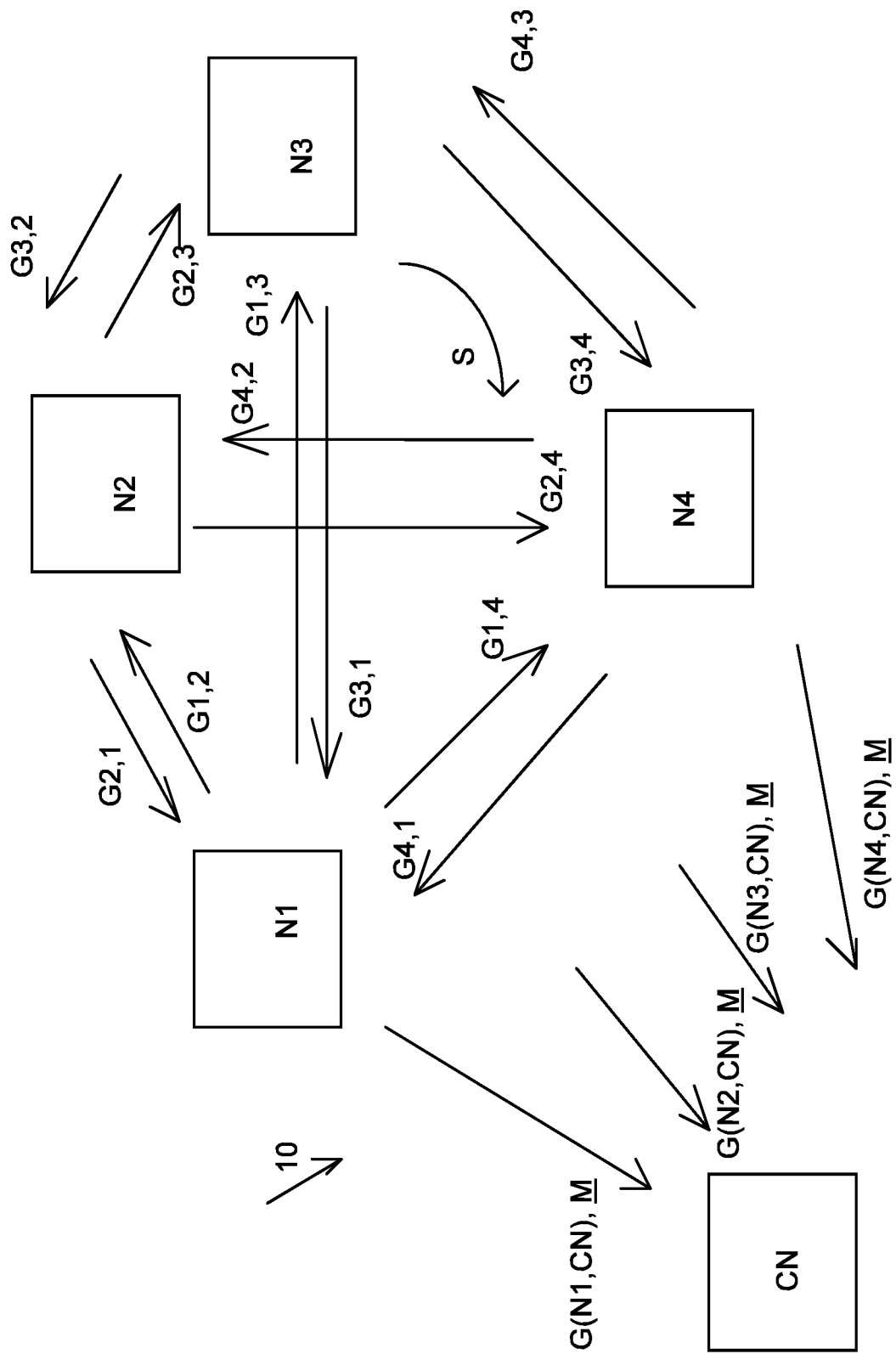
FIG. 2 illustrates another exemplary embodiment of a sequence-based communication network shortly before a new communication node joins the network.

In FIG. 2, it is assumed that the communication node CN can also overhear the communication between the communication nodes N1, N2, N3 and N4. It is further assumed that each of the communication nodes N1-N4 measures the channel quality regarding signals that are received from each of the other communication nodes. The respective measured quality values are forwarded to the corresponding subsequent communication node such that—after one ring cycle—each of the communication nodes N1-N4 has knowledge about the quality of each possible communication link in the communication system 10.

In the embodiment of FIG. 2, the quality values form a 3×4 channel quality matrix $\underline{M}$. For instance, the quality values may be as follows:

$G1,2 = 2 \quad G1,3 = 8 \quad G1,4 = 2$
$G2,1 = 8 \quad G2,3 = 3 \quad G2,4 = 3$
$G3,1 = 2 \quad G3,3 = 2 \quad G3,4 = 2$
$G4,1 = 4 \quad G4,2 = 2 \quad G4,3 = 4$ or $$\underline{M} = \begin{pmatrix} G1,2 & G1,3 & G1,4 \\ G2,1 & G2,3 & G2,4 \\ G3,1 & G3,2 & G3,4 \\ G4,1 & G4,2 & G4,3 \end{pmatrix} = \begin{pmatrix} 2 & 8 & 2 \\ 8 & 3 & 3 \\ 2 & 2 & 2 \\ 4 & 2 & 4 \end{pmatrix}$$

Since the communication node CN can overhear the communication between the communication nodes N1-N4, the communication node CN receives all the quality values and the respective 3×4 channel quality matrix $\underline{M}$. The communication node CN can therefore include this information in its decision making process. For instance, if $$G(N1,CN) \approx G(N4,CN) > G(N2,CN), G(N3,CN)$$

the communication node CN might choose either communication node N4 or communication node N1 as its future predecessor node. However, since G4,1 is significantly better than G1,2, the selection of communication node N1 as its predecessor node might improve the overall link quality because the "good" (G4,1=4) link N4→N1 remains unchanged and the relatively "poor" (G1,2=2) link N1→N2 would be replaced. G(CN,N2) is not necessarily known at the time of the decision making but might be better than G1,2=2, which could be indicated for instance by the quality value G(N2,CN).

Therefore, the communication node CN preferably chooses communication node N4 as its future predecessor node.

Figure 3:
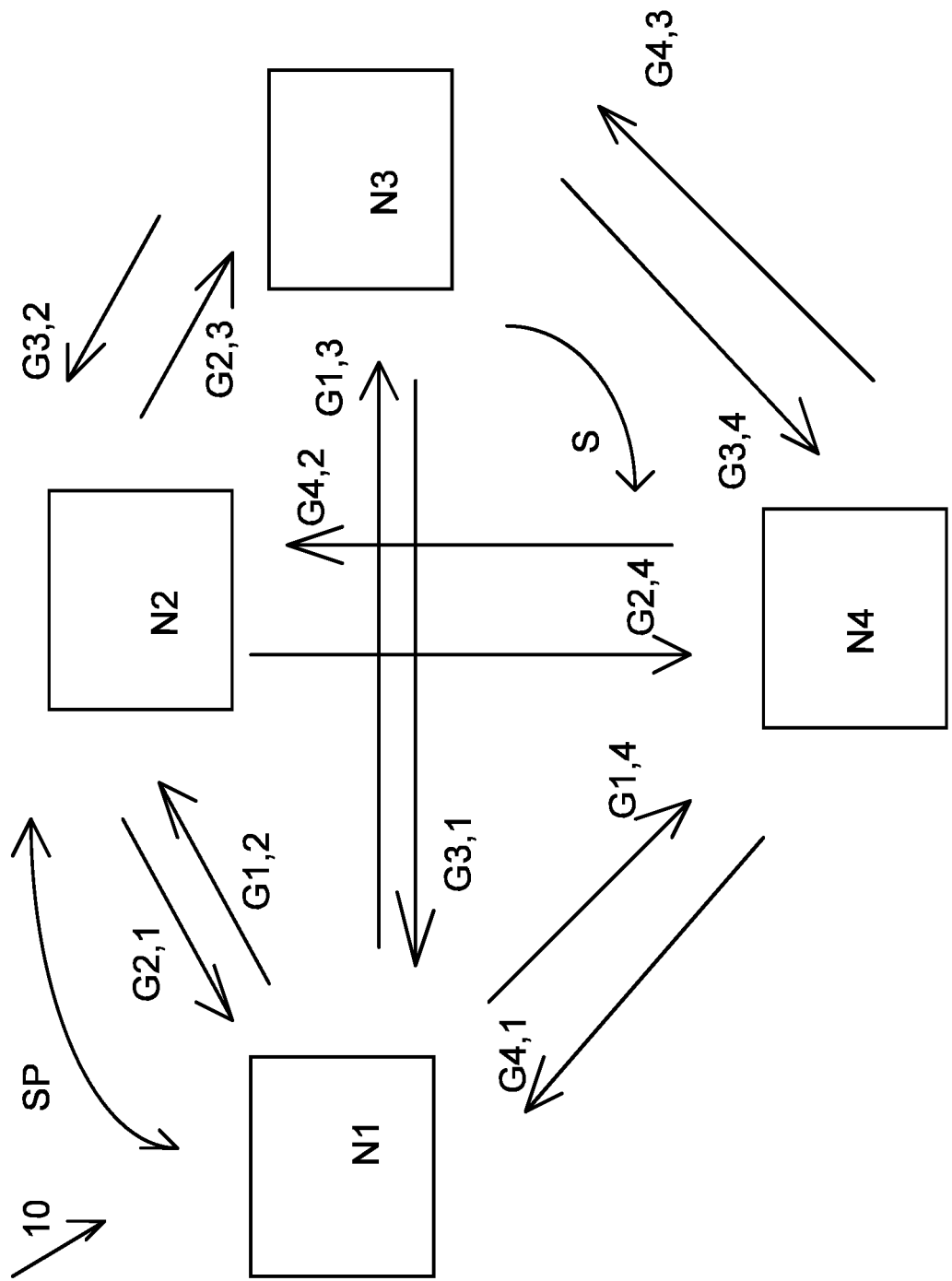
FIG. 3 illustrates an exemplary embodiment of a sequence-based communication network during a swap of places between nodes of the network.

FIG. 3 shows another embodiment of a communication system 10 where communication nodes N1, N2, N3 and N4 communicate with one another according to a token passing sequence S. It is assumed that the sequence utilized is initially N1→N2→N3→N4→N1 etc. and again that each of the communication nodes N1-N4 measures the channel quality with respect to signals received from each of the other communication nodes. The respective measured quality values are forwarded to the corresponding subsequent communication node such that—after one ring cycle—each of the communication nodes N1-N4 has knowledge about the quality of each possible communication link. In the embodiment of FIG. 3, the quality values form a 3×4 channel quality matrix $\underline{M}$, for instance, as follows:

$$\underline{M} = \begin{pmatrix} G1,2 & G1,3 & G1,4 \\ G2,1 & G2,3 & G2,4 \\ G3,1 & G3,2 & G3,4 \\ G4,1 & G4,2 & G4,3 \end{pmatrix} = \begin{pmatrix} 2 & 8 & 2 \\ 8 & 3 & 3 \\ 2 & 2 & 2 \\ 4 & 2 & 4 \end{pmatrix}$$

Since the quality of all possible links are described by the 3×4 channel quality matrix $\underline{M}$, each communication node may determine its best position in the communication sequence S. This will be explained hereinafter with reference to the communication node N1. It is apparent that the explanations below are also valid for the other communication nodes N2-N4 which preferably work identically.

In order to determine its best position in the communication sequence S, the communication node N1 may determine the resulting average channel quality for each possible position in the communication sequence S. Hereinafter, Acq4 designates the resulting average channel quality, if N4 would be the predecessor node of node N1,
Acq2 designates the resulting average channel quality, if N2 would be the predecessor node of node N1, and
Acq3 designates the resulting average channel quality, if N3 would be the predecessor node of node N1.

If the communication node N4 is the predecessor node of the communication node N1, as shown in FIG. 3, the average channel quality Acq4 may be calculated as follows:

$$Acq4 = (G1, 2 + G2, 3 + G4, 4 + G4, 1)/4$$
$$= (2 + 3 + 2 + 4)/4$$
$$= 2.75$$

If the communication node N1 would swap its place with the communication node N2, the resulting communication sequence S would be:

N2→N1→N3→N4

The average channel quality Acq2 would be calculated as follows:

$$Acq2 = (G4, 2 + G2, 1 + G1, 3 + G3, 4)/4$$
$$= (2 + 8 + 8 + 2)/4$$
$$= 5$$

If the communication node N1 would swap its place with the communication node N3, the resulting communication sequence S would be:

N2→N3→N1→N4

The average channel quality Acq3 would be calculated as follows:

$$Acq3 = (G4, 2 + G2, 3 + G3, 1 + G1, 4)/4$$
$$= (2 + 3 + 2 + 2)/4$$
$$= 2.25$$

According to the calculations above, the best predecessor node for the communication node N1 is the communication node N2 since Acq2>Acq1, Acq3 and Acq4

In response to the result of this analysis, the communication node N1 will initiate a modification of the communication sequence S in order to swap its place with the communication node N2. The swap of places is indicated by reference sign SP in FIG. 3. An according swap request can be passed through the communication ring and thereafter being implemented if all other nodes or at least a dedicated node (master node), if any, agree.

Alternatively, once such a favorable switch is discovered, and if the communication node N1 does not hold payload information to be transmitted, it may use an upcoming token holding time of its own to initiate the switch. This initiation may be done by first requesting for the switch with the predecessor of the station to switch with. For instance, if node N3 is identified to be the best node to switch with, N1 would initially request the switch with the predecessor of N3 being N2. If this acknowledges the switch, it may be further announced to its own predecessor (being N4 in the above case), followed by another acknowledgement. If this is successfully acknowledged as well, it is finally announced to the station to switch with (being N3 in this example). The two other predecessors (N2 and N4 in this example) also have to overhear the final announcement of the switch. Only if this is acknowledged by the corresponding station (in this case N3), then the switch is executed in the next token rotation.

Figure 4:
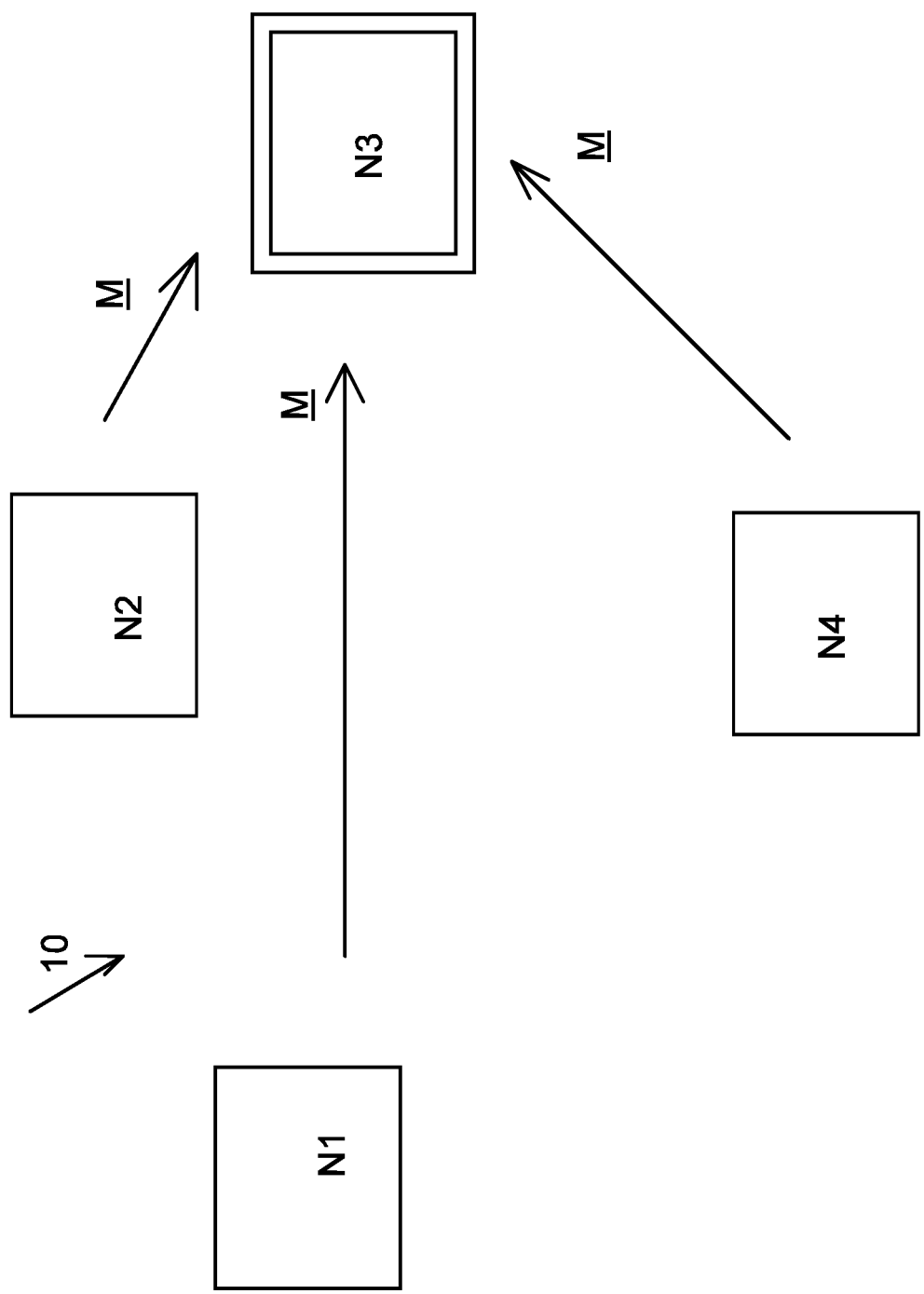
FIG. 4 illustrates an exemplary embodiment of a sequence-based communication during a re-construction of the network after its disintegration.

FIG. 4 shows an exemplary embodiment of a communication system 10 where one communication node, here communication node N3, is operated as a dedicated node. The dedicated node N3 is configured to reconstruct the communication system 10 and its communication sequence S in case that the communication has been disrupted, for whatever reason.

After a disruption of the communication system 10 the dedicated node N3 receives quality data from the former nodes N1, N2 and/or N4 (if they are still active). The quality data may comprise or consist of the 3×4 channel quality matrix $\underline{M}$ as discussed above.

Based on the received data, the dedicated node N3 determines an optimal new communication sequence S with respect to the still active nodes, announces afterwards the new communication sequence S, and finally solicits the entry of the still active nodes into the communication system 10 in accordance with the new communication sequence S.

Figure 5:
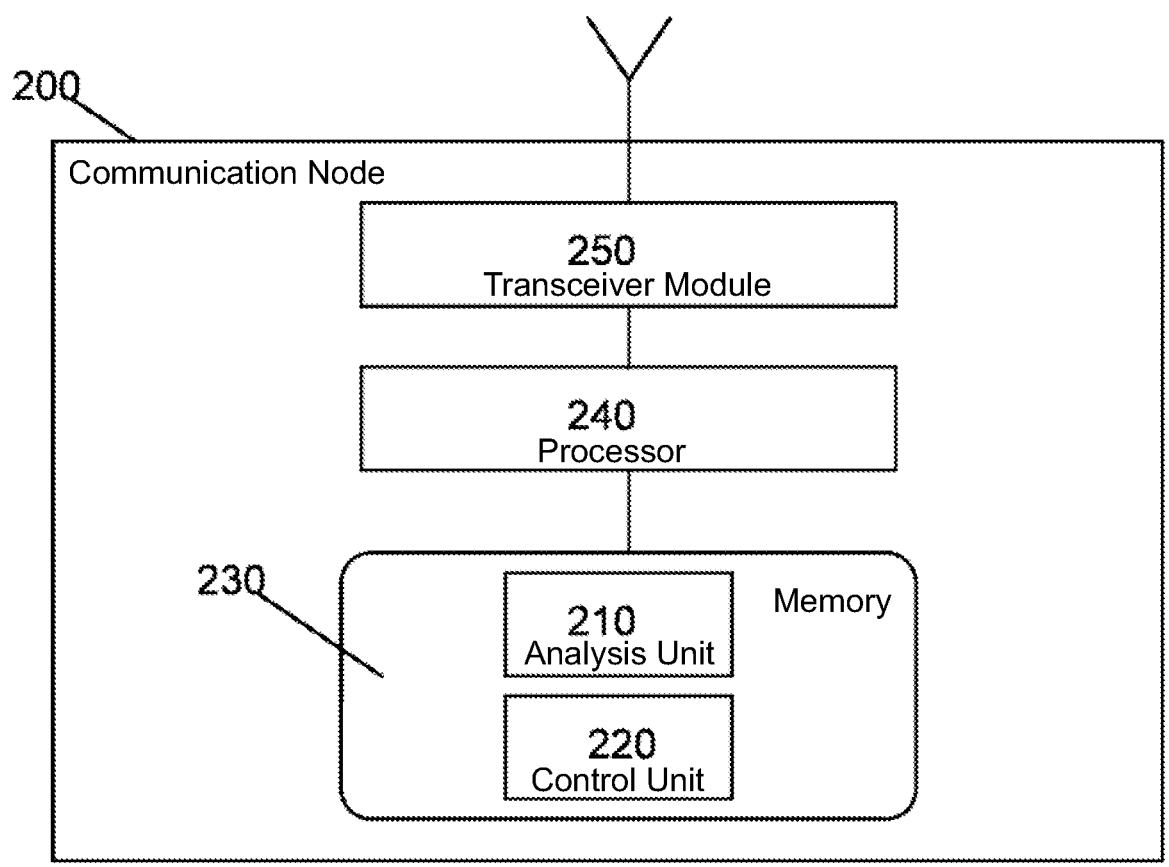
FIG. 5 illustrates an exemplary embodiment of a communication node for the communication networks of FIGS. 1-4.

FIG. 5 shows an exemplary embodiment of a communication node 200 which can form any of the communication nodes N1-N4 or CN mentioned in the explanations above with respect to the embodiments shown in FIGS. 1-4.

The communication node 200 comprises an analysis unit 210 and a control unit 220. The analysis unit 210 and the control unit 220 are preferably software modules which are stored in a memory 230 of the communication node 200. A processor 240 of the communication node 200 is connected with the memory and runs the software modules 210 and 220. A transceiver module 250 of the communication node 200 transmits and receives data signals.

The analysis unit 210 may be programmed and thus configured to determine the optimal position of its communication node 200 inside a communication sequence S before and/or after joining a communication system 10 (see FIGS. 1-4).

The control unit 220 is preferably programmed and thus configured to manage the entry into the communication system 10. The control unit 220 evaluates join messages that are received from nodes of the communication system, accepts the join message from the optimal predecessor node that has been identified by the analysis unit 210, and ignores join messages from other nodes of the communication system.

The control unit 220 is preferably further programmed and thus further configured to carry out a swap of places with another node of the communication system in order to improve the position of its node 200, if the results of the analysis unit 210 recommend such a swap.

The control unit 220 is preferably further programmed and thus further configured to transmit—after disruption of the communication system—a request to join a restored communication system as well as stored quality data that describe the quality of communication links between nodes of the disrupted communication system.

Moreover, the control unit 220 may be programmed and thus further configured to allow its communication node 200 to act as a dedicated node. After disruption of the communication system, the dedicated node receives quality data from former and still active nodes of the communication system, determines an optimal new communication sequence, announces the new communication sequence, and solicits the entry of nodes into the communication system in accordance with the new communication sequence.

In summary, the embodiments discussed above with reference to FIGS. 1-5 can carry out a topology management in a sequence-based network such as for instance an EchoRing (i.e. a token-passing based wireless network where a token is passed from one node to the subsequent node according to a token passing sequence). The token-passing is vital to the time management in a wireless system for latency-critical applications. As token-passing assumes a fixed sequence in which the token is passed through the network, and the links between nodes have typically different qualities, there is always some token-passing sequence better than the rest of the sequences, where better refers to the reliability that can be achieved while passing on the token. Therefore, a goal is to allow a token-passing system like EchoRing to achieve this optimal token-passing sequence during run-time as the link qualities in the network might change over time. In this regard, three different mechanisms have been explained in an exemplary way with reference to FIGS. 1-5:

"Optimal Joining of a New Station":

In case that a new station wants to join an already existing ring (e.g. EchoRing network), the usual procedure prescribes the station to wait for a soliciting announcement of some other station in the existing network, and then indicate through a special message the interest to join the network. This is done without any considerations of link states. In the procedure discussed above, the new station first observes the channel states to all stations in the existing network, before it answers to a soliciting message. Thus, after collecting enough channel information, the station chooses to answer a soliciting message from that station to which is has the most favorable link condition. The channel observation can be conducted by the station through overhearing normal token transmissions in the system.

"Sequence Adjustment During Network Operation":

During the operation of the communication system (e.g. EchoRing system), link states might change in significant ways, making a new token-passing sequence a better choice than the old one. In order to adjust for reconfigurations of the system at run-time, the above described mechanism seems favorable: Based on the distributed channel state information, stations periodically check if the token-passing sequence could be improved by changing their position in the order with any of the other stations (only considering the paired switch). In order to do so, each station must be provided with the token passing sequence, which could be announced by a separate message or could be observed from the operation of the network. Once such a favorable switch is discovered, and if the station does not hold payload information to be transmitted, it may use an upcoming token holding time of its own to initiate the switch. This initiation may be done by first requesting for the switch with the predecessor of the station to switch with. If this acknowledges the switch, it may be further announced to its own predecessor, followed by another acknowledgement. If this is successfully acknowledged as well, it may be finally announced to the station to switch with. The two other predecessors also overhear the final announcement of the switch. If this final message is acknowledged by the corresponding station, then the switch may be executed in the next token rotation.

"Optimal Restoration of a Completely Disassembled Network":

Due to sudden channel changes, or interference, a ring system (e.g. EchoRing system) can completely disintegrate. If this happens, a dedicated station, which takes care of the reformation, can significantly reduce the down-time of the network. Such a station can be defined through an announcement periodically during the ring operation. If the ring disintegrates, the rebuilding is now performed in the following way: Stations belonging previously to the ring send periodically announcement messages with their interest to join a network. These messages contain information on overheard previous channel states that they have measured from other packet transmissions. These should contain a station address to identify the links. Once this information has been collected by the dedicated station, it generates a token-passing sequence that is most reliable with respect to the collected channel state information. Based on this, it starts to solicit the entry of stations into a new ring, announcing the new sequence. Stations overhearing this message with the new sequence wait then for the ring to form until it is their turn to join the ring.

The invention claimed is:

1. Communication node (CN, N1-N4) capable of communicating with other nodes in a communication system (10) according to a given communication sequence (S), wherein the communication node comprises a processor that runs an analysis unit configured to determine the optimal position of its communication node inside the communication sequence (S) as well as the corresponding optimal predecessor node, wherein the communication system is a token-passing based wireless ring system where a token (T) is passed from node to node according to said given communication sequence which thereby forms a ringlike token passing sequence, wherein the communication node is configured to measure the channel quality regarding signals that are received from each of the other communication nodes of the communication system, and wherein the communication node is further configured to forward respective measured quality values to its allocated, with respect to the ringlike token passing sequence, downstream communication node such that—after one ring cycle—each of the communication nodes (N1-N4) has knowledge about the quality of each possible communication link in the communication system (10).

2. Communication node of claim 1, characterized in that the communication node is configured to transmit the measured quality values as part of the token or within the token.

3. Communication node of claim 1, wherein the communication node is configured to generate a channel quality matrix based on the measured quality values.

4. Communication node of claim 3, wherein the communication node is configured to transmit the channel quality matrix to its allocated downstream communication node as part of the token or within the token.

5. Communication node of claim 1, characterized in that the analysis unit is configured to determine the optimal position of its communication node inside the communication sequence before joining the communication system.

6. Communication node of claim 1, wherein the token passing sequence is simple ring-shaped, such that after leaving a given node, the token reaches this given node again after completing the entire token passing sequence and having been forwarded by each of the other nodes of the token passing sequence.

7. Communication node of claim 1, wherein the token passing sequence is extended ring-shaped, such that one or more nodes receive and forward the token more than once during each token passing sequence.

8. Method of operating a communication node (CN, N1-N4) that is capable of communicating with other nodes in a communication system (10) according to a given communication sequence,
wherein the optimal position of the communication node inside the communication sequence as well as the corresponding optimal predecessor node is determined, characterized in that
wherein the communication system is a token-passing based wireless ring system where a token (T) is passed from node to node according to said given communication sequence which thereby forms a ringlike token passing sequence,
wherein the communication node measures the channel quality regarding signals that are received from each of the other communication nodes of the communication system, and
wherein the communication node further forwards respective measured quality values to its allocated downstream communication node, with respect to the ringlike token passing sequence, such that— after one ring cycle— each of the communication nodes (N1-N4) has knowledge about the quality of each possible communication link in the communication system (10).

9. Method of claim 8, wherein the communication node transmits the measured quality values as part of the token or within the token.

10. Method of claim 8, wherein the communication node generates a channel quality matrix based on the measured quality values.

11. Method of claim 10, wherein the communication node transmits the channel quality matrix to its allocated downstream communication node as part of the token or within the token.

12. Method of claim 8, characterized in that the communication node is operated as a dedicated node that— after disruption of the communication system— receives quality data from former nodes of the communication system, determines an optimal new communication sequence, announces the new communication sequence, and solicits the entry of nodes into the communication system in accordance with the new communication sequence.

13. Method of claim 8, wherein the token passing sequence is simple ring-shaped, such that after leaving a given node, the token reaches this given node again after completing the entire token passing sequence and having been forwarded by each of the other nodes of the token passing sequence.

14. Method of claim 8, wherein the token passing sequence is extended ring-shaped, such that one or more nodes receive and forward the token more than once during each token passing sequence.

15. Communication system comprising nodes (CN, N1-N4) capable of communicating with other nodes in a communication system (10) according to a given communication sequence (S),
wherein each of the communication nodes comprises a processor that runs an analysis unit configured to determine the optimal position of its communication node inside the communication sequence (S) as well as the corresponding optimal predecessor node,
wherein the communication system is a token-passing based wireless ring system where a token (T) is passed from node to node according to said given communication sequence which thereby forms a ringlike token passing sequence, and
wherein each communication node is configured to measure the channel quality regarding signals that are received from each of the other communication nodes of the communication system, and
wherein each of the communication nodes is further configured to forward respective measured quality values to its allocated— according the ringlike token passing sequence—downstream communication node such that— after one ring cycle— each of the communication nodes (N1-N4) has knowledge about the quality of each possible communication link in the communication system (10).

16. Communication system of claim 15, wherein each of the communication nodes is configured to transmit the measured quality values as part of the token or within the token.

17. Communication system of claim 15, wherein each of the communication node is configured to generate a channel quality matrix based on the measured quality values.

18. Communication system of claim 17, wherein each of the communication node is configured to transmit the channel quality matrix to its allocated downstream communication node as part of the token or within the token.

19. Communication system of claim 15, wherein the token passing sequence is simple ring-shaped, such that after leaving a given node, the token reaches this given node again after completing the entire token passing sequence and having been forwarded by each of the other nodes of the token passing sequence.

20. Communication system of claim 15, wherein the token passing sequence is extended ring-shaped, such that one or more nodes receive and forward the token more than once during each token passing sequence.

21. Communication system of claim 15, wherein the communication node comprises a memory and wherein the analysis unit is stored in the memory.

22. Communication mode of claim 1, further comprising a memory and wherein the analysis unit is stored in the memory.

* * * * *